3,236,693
ELECTRODE FOR FUEL CELLS
Philip D. Caesar, Princeton, N.J., assignor to Socony
Mobil Oil Company, Inc., a corporation of New York
No Drawing. Filed Oct. 11, 1963, Ser. No. 315,712
7 Claims. (Cl. 136—86)

This application is a continuation-in-part of copending application Serial No. 183,711, filed March 30, 1962, and now abandoned.

This invention relates to electrodes for fuel cells, especially low temperature fuel cells which operate at temperatures at which catalysts may effectively influence the electrode processes.

Owing to the complexity of the processes which may occur at fuel cell electrodes, particularly the fuel electrode, their development has encountered many difficulties. Some of the important criteria necessary for their successful use include a high surface area on which the electrode processes may take place, and effective catalysts to speed up the desired processes. Stability in use is also important, mainly in respect to the electrolytes with which the electrodes are employed, and as is known, acidic electrolytes are particularly active against many electrode materials.

The invention provides electrodes designed to meet these criteria. More particularly, it relates to electrodes comprising an electron-conducting material, such as carbon, having suitably associated therewith an electrochemically active catalyst, such as platinum, and a crystalline aluminosilicate of the molecular sieve type, which provides catalytic effects as will be described.

Considering the invention in detail, the electron-conducting material is preferably porous carbon or graphite having an internal surface area of at least 1, and more preferably 50 or 100 to 500, sq. m./g., a porosity of 10 to 35%, pore size of 0.1 micron, or less, to 100 microns, preferably 0.5 to 50 microns, a real density of 1.9 to 2.24, and apparent density of 1.0 to 1.9.

The electrochemically active catalyst is preferably platinum. It may be incorporated in the electrode by impregnating the carbon with a solution of a platinum compound of desired strength and then decomposing the compound as by heating to form elemental platinum or the oxide thereof. Or the solution of the compound may be electrolyzed to deposit platinum on the carbon. It will be apparent that the catalyst is present in finely subdivided form. Other useful catalysts are palladium, iridium, ruthenium, copper, nickel, rhodium, vanadium, manganese, tungsten, molybdenum, and rhenium. These are conventional, and may be applied to the carbon by procedures generally similar to those described, or by other conventional procedures.

The crystalline aluminosilicates, or zeolites, comprise natural or synthetic materials which contain aluminum and silicon in fairly definite proportions. The zeolites have a generally crystalline structure, as shown by X-ray diffraction examination of zeolite powders; whether or not this is rigorously true, they are possessed of an ordered internal structure, and the word "crystalline" is used in such sense.

The zeolites in hydrated salt form may be typified by the general formula:

$$M_{2/n}O \cdot (Al_2O_3) \cdot X(SiO_2) \cdot YH_2O$$

where M is at least one exchangeable metal cation, hydrogen ion, ammonium ion, or mixtures of two or more of the foregoing; n is the valence of M; X is widely variable, but for purposes of the invention, and as described below in more detail, should be at least 6; and Y is a small integer, usually varying from 0 to 7 but capable of greater variation. Preferably the metal cation is selected from group IA of the periodic table comprising Li, Na, K, Rb, Cs, and Fr, or from group IIA comprising Be, Mg, Ca, Sr, Ba, and Ra, or from group IIB comprising Zn, Cd, and Hg. It may also comprise a transition element having an atomic number in the range of 21 to 28, or 39 to 46, or 72 to 78; or it may be a type 4f or a type 5f rare earth element.

Owing to the ordered structure of the zeolites, they exhibit a high internal surface area, and are characterized by the presence of a multiplicity of pores of definite size. Thus, a particular zeolite can accept molecules of a size and shape capable of entering its pores and reject molecules larger in size or different in configuration. Because of this, they are frequently referred to as molecular sieves. The zeolite selected for an electrode should, therefore, be able to receive, or occlude, in its pores the particular fuel desired to be used. Such action of occlusion is also generally referred to as sorption, and more particularly as adsorption, and the occluded fuel as the adsorbate. A second important criterion of the selected zeolite is that it be stable in the acid electrolyte of the fuel cell in which the electrode incorporating it is used. As will be apparent, the electrode is in continuous contact with the electrolyte, and as the latter may be an aqueous acidic electrolyte, the electrode is required to withstand its continuous effect. One effect is that the zeolite may be at least partially converted to the acid, or H, form, and if it is not stable in this form, or if the zeolite is not stable on continuous contact with the acid electrolyte, it is liable to be degraded, with the result that its lattice structure may break down and its usefulness impaired or destroyed.

According to the invention, a zeolite is used which is stable in the acid form, and stable during continuous contact with aqueous acid electrolyte, and for this purpose only those zeolites are selected which have a high silica content, i.e., those having a silicon:aluminum ratio of at least 3:1, and preferably at least 3.3:1. The upper limit of the ratio may be as high as desired. Preferred upper ratios may range from 19:1 to 20:1, although this upper ratio may go to 90:1 or more, and as indicated, is a matter of desire. Zeolites having a high silica content as represented by the foregoing ratios are resistant to acid attack, i.e., they do not suffer structural collapse upon prolonged contact with acid. In some cases, they may undergo a desirable pore enlargement by contact with the acid and conversion thereby to at least partial acid form.

The zeolites are preferably used in particles sizes of 10 microns and below, desirably 1 micron and below, although larger particles of up to 50 microns diameter, and more, are suitable.

A specific example of a high silica crystalline aluminosilicate is H-mordenite, i.e., the hydrogen or acid form of the zeolite mordenite, Mordenite, in the hydrated salt form corresponds to:

$$Na_8 \cdot (AlO_2)_8 \cdot (SiO_2)_{40} \cdot 24H_2O$$

It occurs naturally, and has also been synthesized. It has a Si:Al ratio of 5:1, as is apparent, and is believed to have two systems of pores, one of free diameter of the order of 4 to 6.6 A, and a second, interconnecting the first and parallel to another crystal axis, with pores of the order of 2.8 A free diameter. Mordenite may be provided in the H form by leaching with hydrochloric acid, rinsing, and drying, thereby replacing a desired amount of the exchangeable metal cation with hydrogen and forming the H or acid form. Desirably, about 50% by weight of the material may be converted to the acid form prior to use in an electrode, although such conversion may also proceed in situ, i.e., natural mordenite may be used to fabricate the electrode and be converted to the acid form by the acid electrolyte.

Mordenite adsorbs fuel molecules having a critical dimension below about 6.6 A and rejects molecules having a critical dimension above such value. Critical dimension is defined as the maximum dimension of the minimum projected cross-section of the adsorbate molecule; or as the diameter of the smallest cylinder which will accommodate a model of the adsorbate molecule using accepted values of bond distances and bond angles and van der Waals' radii. Thus, mordenite adsorbs fuel molecules like benzene, cyclohexane, pentane, propane, ethylene, etc.

Another example is a synthetic crystalline zeolite known as zeolite L having the generalized formula:

$$1.0 \pm 0.1 M_{2/n}O \cdot Al_2O_3 \cdot 6.4 \pm 0.5 SiO_2 \cdot yH_2O$$

wherein $y$ varies from 0 to 7. It will be seen that when more than 6 moles of $SiO_2$ are present, the Si:Al ratio is more than 3. This material has interstitial channels which will receive fuel molecules having critical dimensions up to about 9.1 A. It adsorbs unsaturated straight chain hydrocarbons (alkenes) like propylene and butene-1, and also molecules like benzene, isobutane, n-pentane, cyclohexane. Generally, molecules having critical dimensions greater than about 9.1 A are rejected.

A further example is a synthetic crystalline zeolite, designated zeolite T, having the formula:

$$1.1 \pm 0.4[xNa_2O \cdot (1-x)K_2O] \cdot Al_2O_3 \cdot 6.9 \pm 0.5 SiO_2 \cdot yH_2O$$

wherein $x$ varies from 0.1 to 0.8 and $y$ from 0 to 8. The Si:Al ratio is 3.2 to 3.7. Its interstitial channels will receive fuel molecules having critical dimensions up to about 5.0 A. Molecules like ethylene, acetylene, propylene, butene-1, propane, and n-pentane are adsorbed by it, particularly propylene.

Still other examples include the following naturally occurring zeolites:

Brewsterite: $BaSrAl_2Si_6O_{16} \cdot 5H_2O$
Heulandite: $CaNa_2Al_2Si_6O_{16} \cdot 5H_2O$
Epistilibite: $CaAl_2Si_6O_{16} \cdot 5H_2O$
Erionite: $CaMgNa_2K_2Al_2Si_6O_{16} \cdot 6H_2O$
Stilbite: $Na_2CaAl_2Si_6O_{16} \cdot 6H_2O$ It will be seen that the silicon:aluminum ratio in each case is 3:1.

It is noteworthy that the interstitial channels in these materials have diameters that are fixed and uniform. In the natural zeolite these channels hold the water of hydration, but by heating the zeolite and simultaneously applying a vacuum, the water molecules may be continuously removed, at least in part, through orifices in the zeolite surfaces, leaving an open porous structure or empty network of channels; and the zeolite is said to be activated; in other words, the channels may receive other suitable molecules.

As indicated, the exchangeable cation denoted by M in the general formula is exchangeable either partially or completely by the other cations noted, thus providing zeolites of varying adsorption capacity. The base or ion exchange process by which the exchange may take place is conventional and may be conveniently carried out by heating the original zeolite in the presence of a suitable aqueous salt solution which contains the cation desired to be introduced. There is thus produced a zeolite richer in the newly added cations. In some cases a further stabilizing effect may be conferred on the zeolite by using a polyvalent rare earth metal as the exchanging cation. Base exchanged zeolites may enjoy another advantage in that their catalytic activity may be enhanced by associating catalytic elements with the alumino-silicate structure, particularly the transition metals and rare earth elements, already noted. It may be observed here that the foregoing cations, including those previously mentioned, may be associated with the zeolite by any known method, resulting in incorporation of the element in the crystal lattice, or in physical entrapment in the zeolite.

The selected zeolite is conveniently incorporated in the electrode structure by forming a suspension of the zeolite in any suitable liquid, preferably water, and then applying the same in a suitable way.

Considering the fabrication of the electrode in greater detail, several illustrative procedures may be described. In one method the electrochemically active catalyst such as platinum may be applied to the carbon particles. More particularly, this step may be carried out by soaking, and mixing, the mass of carbon in a solution or dispersion of any suitable, preferably heat-decomposable, platinum compound. It is convenient to use aqueous solutions of the compound, and a particularly suitable compound is chloroplatinic acid, comprising platinic chloride dissolved in aqueous HCl, which may be employed in concentrations of 5 to 25% by weight. After impregnation, the mass of carbon is removed from the solution, dried at 200–250 F., then heated for 1–3 hours at about 800° F., preferably in a stream of inert gas such as nitrogen, and then reduced with hydrogen at 800–900° F. to obtain elemental platinum on the carbon. Using a 10% by weight solution of chloroplatinic acid, the foregoing procedure will deposit 1–2% by weight platinum on the carbon, and this amount can be varied by varying the strength of the solution. Following application, the mass may be mixed thoroughly with a well dispersed suspension of the zeolite, such as one containing 5–25%, preferably 5–10%, by weight of finely divided zeolite suspended in water. Thereafter the mass is dried and may be pressed to a desired shape. As is apparent, the zeolite is dispersed throughout the electrode structure.

A second method of fabricating the electrode comprises forming the carbon particles in the desired structural shape, as by pressing in an appropriate mold. For example, the carbon, which may comprise a suitable mixture of calcined petroleum coke and graphite, may be mixed with a soft pitch binder, dried, ground, placed in a disc mold, or a mold of any other suitable shape, and compressed at a pressure of 1–20 tons/sq. in., preferably 5 to 10 tons/sq. in. Thereafter the structure may be baked by heating over a period of several hours or even days at varying temperatures above about 400° F. Such heating has the effect of reducing the size of the pores, and the extent of this effect may be controlled by suitable choice of the molding pressure, and the temperature and duration of heating. It is thus possible to form pores of one size on one side of the electrode and pores of a different size on the other side by heating the two sides at different temperatures. Thereafter the structure may be impregnated with platinum, using substantially the procedure described, although the solution of platinum compound may also be applied by brushing, spraying, dipping, etc. The zeolite is then applied from an aqueous suspension, using any of the techniques described, and the electrode dried. It will be apparent that in the resulting electrode the zeolite is concentrated on the surfaces.

According to a third method, it is feasible to apply the platinum catalyst to the carbon particles, as described, then to compact the mixture into electrode shape, and then to apply the zeolite suspension by spraying, brushing, immersion, etc., followed by drying. This method also concentrates the zeolite on the surfaces of the electrode.

In still another method, which may be described for convenience in terms of producing a flat structural shape, the electrode may be formed in halves which are then combined. One half may be formed by impregnating carbon particles with a catalyst like platinum and then pressing the same to shape. The other half may also be formed from carbon particles, and the platinum may or may not be incorporated therewith, but in either case the zeolite is added in the manner described, followed by pressing. The two halves are then united, as by pressing, to form the electrode, and it will be seen that the zeolite is concentrated in and through only one side of the electrode, this being the side which fronts on the fuel inlet side of the fuel cell.

It will be understood that in the foregoing methods, the other described electrochemical catalysts may be used besides platinum and that suitable solutions of the same are available for incorporating the catalyst in the electrode. For example, solutions of nickel nitrate, palladium nitrate, rhodium trichloride, and the like are available which decompose on the application of heat to form respectfully, nickel, palladium, rhodium, etc. catalysts in metal form.

Referring to the formed electrode, and for convenience to the preferred composition, the carbon is present in the largest amount in order to perform the function of collecting and transmitting electrons. The electrons, as is understood, travel along the fuel electrode and then out through the draw-off terminal and the external circuit to the oxygen electrode. Carbon is therefore the predominant component and may comprise 51 to 98% by weight of the electrode, preferably 70 or 80 to about 95 or 98%. The foregoing ranges apply generally to other electron-conducting materials besides carbon. The platinum catalyst is present in catalytic amounts, desirably from 0.01 to 5 or 10 weight percent of the electrode, and preferably from 0.05 or 0.1 to 1 or 2%. Catalysts like gold and palladium may be used in substantially the foregoing amounts, while the other electrochemical catalysts may be present in larger amounts ranging from 0.1 to 25%, or more, by weight of the electrode. In relation to the area of the electrode surface, an amount of about 0.1 g. of electrochemical catalyst may be equivalent roughly to about 0.009 g./sq. cm. of electrode area. Thus, a range of 0.01 to 10 g. of catalyst would be roughly equivalent to 0.0009 to 0.9 g./sq. cm. of electrode area. The zeolite is also used in catalytic amounts and suitably may range from 0.1 to 20%, more usually 1 to 5 or 10%, by weight of the electrode.

As will be understood, platinum and the other electrochemical catalysts aid in the adsorption and/or splitting of the fuel molecules and reduce the activation energy required for initiating the electrochemical oxidation reaction. Where a fuel such as a hydrocarbon is first converted to produce hydrogen, as noted below, the catalyst performs its usual functions of chemisorbing the molecular hydrogen, splitting the latter to form chemisorbed hydrogen atoms, and catalyzing the electrochemical oxidation of the latter to produce one electron per hydrogen atom. It is apparent that the functions of the carbon and the electrochemical catalyst are well served by maintaining all or substantially all of the latter particles in contact with the carbon particles.

The zeolite is a bond-rupturing catalyst and influences the conversion of fuels to produce products more amenable to the electrochemical reaction. For example, under its influence an aliphatic hydrocarbon fuel like propane may be converted to hydrogen and a propyl radical; the hydrogen is directly useful in the electrochemical reaction as noted; the propyl radical may or may not undergo direct conversion to produce electrons (and carbon dioxide and water), and/or it may be further converted to hydrogen and other products, such as olefins and radicals like ethyl, which themselves are capable of further useful reactions. It will be apparent that the formation of radicals and olefins, even though no electrons may be produced, are potentially useful reactions as these products may ultimately lead to electron-forming reactions. The zeolite may influence the conversion of both saturated and unsaturated fuels, and also straight, branched, and closed chain fuels. As described, it is preferably used in finely subdivided form, i.e., 10 microns or less, and as may be apparent, the effectiveness of the electrode is served by having substantially all of the zeolite particles in contact with or closely adjacent, the electrochemically active catalyst. As the zeolite is ion-conductive, ions formed as a result of its action may flow directly to the latter catalyst or may reach it by passing through the surrounding electrolyte.

The electrode may be of conventional shape, i.e., in strip, sheet, disk, or cylindrical form. Its thickness is variable; for example, it may range from $\frac{1}{32}$ to $\frac{1}{4}$ inch, preferably from $\frac{1}{16}$ to $\frac{1}{4}$ inch. It will be understood that the electrode is porous. Depending on its use in a fuel cell, the pores may extend through the electrode from one side to the other or may be disposed in one side only. The size of the pores may be in the range of 0.05 to 50 microns. It will also be understood that the resistivity of the electrode per se will not exceed that of the electrolyte.

To minimize adsorption of water by the zeolite component of the electrode, the latter may be fabricated so that the zeolite is concentrated on one surface thereof, and this surface is disposed toward the fuel inlet side and away from the aqueous electrolyte of the fuel cell. The pores in the electrode on the electrolyte side may be suitably small to permit electrolyte to enter by surface tension or capillary forces, while the pores in the electrode on the fuel or zeolite-containing side may be larger so that fuel pressure may overcome the surface tension forces and thus prevent electrolyte from entering them. Smaller and larger pores may be produced in the electrode in the manner described, and also by employing components of smaller particle size to create smaller pores and components of larger particle size to create larger pores.

The effect of water adsorption by the zeolite component of the electrode may also be provided for, or taken into account, by employing an electrode having the zeolite dispersed in and throughout the same; thus, although on the electrolyte side of the electrode some of the zeolite may adsorb water, nevertheless on the opposite or fuel side the zeolite will not adsorb water but will be available to perform the function of occluding fuel in its pores.

The use of the electrode is not restricted to any particular operation of the fuel cell. For example, considering a fuel cell having spaced-apart electrodes with an electrolyte compartment therebetween, the fuel may be introduced to the porous fuel electrode on the side remote from the electrolyte so that at least a portion of the fuel passes through the porous electrode. Or the fuel and electrolyte may be mixed and passed to the fuel electrode. Or the fuel and electrolyte may be mixed and passed to the fuel electrode on the side remote from the electrolyte so that at least a portion of the mixture passes through the pores in the electrode and into the electrolyte compartment. Or the fuel-electrolyte mixture may be introduced to the electrolyte compartment, through which a flow may be maintained, so that the mixture is adsorbed by the pores in that side of the fuel electrode adjacent the electrolyte compartment. Where fuel-electrolyte mixtures are used, the fuel should not undergo a reaction or interfere with the processes at the oxygen electrode, although it may be noted that the occurrence of such reaction or interference may be controlled by conventional measures.

Conventional acidic electrolytes are useful and may include aqueous solutions of phosphoric, nitric, perchloric, chloracetic, and other strong acids. Also applicable are aqueous solutions of ionizable acidic salts. It will be understood that while the electrode is particularly intended for use with the foregoing electrolyte, its utility is not limited thereto as it is of value with other electrolytes, such as conventional ion exchange membranes. It will also be understood that the electrolyte does not react with the fuel.

The electrodes are particularly suitable in fuel cells employing conventional operating conditions, including ambient temperatures and pressures. Where the fuel is higher boiling, temperatures just below the boiling point may be used at atmospheric pressure, although higher pressures may be used and in turn higher temperatures.

For example, temperatures may range to 200° C. and pressures to about 10 or 20 atmospheres. The increased temperatures and pressures may also apply to lower boiling fuels.

A variety of fuels may be employed with the electrodes, including normally liquid and normally gaseous alkanes and alkenes, and also cycloalkanes, cycloalkenes, and aromatic hydrocarbons. Other fuels are oxygenated hydrocarbons, including alcohols, aldehydes, carboxylic acids, esters, ethers, etc., and also hydrazine, carbon monoxide, and hydrogen. As described, the fuel to be used is one which may be received within the pores of the selected zeolite, and conversely, the zeolite chosen is one whose pores will receive the desired fuel.

In place of carbon as the electron-conducting material, it is possible to employ a gauze or screen of very fine mesh made of metals like titanium, nickel, platinum, palladium, cobalt, iron, tungsten, or molybdenum. The electrochemical catalyst may be applied to a surface of the screen or sieve, followed by the zeolite, in the manner described, although in many cases it may also be possible to electrodeposit the catalyst on the screen while retaining the mesh structure. The screen or sieve may have openings ranging from 1 micron to 1000 or 2000 microns in diameter, preferably from 50 to 500 microns. If desired, two screens may be used, the catalyst applied to one or both surfaces of one screen, the zeolite to one or both surfaces of the other, and the screens pressed and held together so that the catalyst and zeolite surfaces are mated. The foregoing electron-conducting materials may also be in particle form, and the electrode fabricated therefrom by compacting the powder. For example, titanium powder may be compacted to shape, platinum black catalyst electrodeposited thereon, and the zeolite applied as described to produce a porous electrode structure having pore diameters in the range of 1–50 microns. Or platinum catalyst may be deposited on porous nickel, or on a porous stainless steel sheet as the electron-conducting material, and the zeolite applied over the platinum.

Referring again to the fabrication of the electrode, another useful construction comprises an electron-conducting member in the form of a flexible carbon or graphite cloth, this being the product of carbonizing conventional regenerated cellulose fibers or fabric. Such flexible graphite cloth, which is commercially available, may be impregnated with a catalyst such as platinum, as by painting or spraying a solution of heat-decomposable platinum salt thereon, or immersing the flexible cloth in the solution, followed by developing the platinum metal by heating. The zeolite may then be applied by immersing the structure in a fine aqueous suspension of zeolite, or by painting the latter thereon, and drying. Flexible carbon knit or felt material, or yarn or fibers, are also suitable in place of or with the flexible cloth and may enable a desired variation of porosity to be obtained.

An alternative to the foregoing procedure comprises forming regenerated cellulose cloth into the desired shape and thickness, impregnating the same with an aqueous solution of chloroplatinic acid, or other catalyst compound, and then heating slowly in an inert oxygen-free atmosphere to a temperature in the range of 250 to 500° F. for a period of about ½ to 2 hours to obtain substantially complete thermal decomposition of the non-carbon constituents of the cloth. The heating step is regulated to secure slow gasification in order to prevent rupture of the fibers. When carbonization of the cloth is substantially complete, heating may be continued at a higher temperature, going up to about 800° F., to insure decomposition of the catalyst compound and to obtain the catalyst in metal or oxide form on the carbon fibers. After cooling, an aqueous suspension of the zeolite may be applied to the impregnated carbon fibers in any suitable way, preferably by immersion, and the structure then heated sufficiently to drive off the water. If desired, the resulting structure may be treated with steam at a temperature of 1200° to 1800° F. to activate the carbon, although this step may be performed at any point in the preparation of the structure. While the carbonized fibers have a substantial tensile strength, such that the structure may be used per se, it may be desirable to support the same between a pair of metal gauze or screen members.

The electrode of the invention and its preparation may be illustrated as follows. Substantially equal parts of petroleum coke and graphite are mixed with a sufficient amount of soft pitch binder to hold the particles, and the mixture is dried by heating. Thereafter it is finely ground, and the mass is immersed in a 10% by weight aqueous solution of chloroplatinic acid and thoroughly stirred over a period of several hours. The mass is removed from the solution, drained, and dried by heating at about 230° F. for an hour. The temperature is then raised to about 800° F. for a period of 2 to 3 hours while admitting nitrogen gas to the mass in order to decompose the platinum compound, after which the flow of nitrogen is stopped and hydrogen is introduced, while continuing the heating, to obtain elemental platinum. During the reduction, the temperature may be maintained at 800° F. or increased somewhat to about 850° F. Approximately 1% by weight of platinum metal is thus deposited on the carbon particles. A 5% by weight suspension of zeolite T is then prepared by dispersing finely subdivided zeolite T, particle size of about 2 to 3 microns, in water and agitating. The platinum-impregnated carbon is soaked in the suspension, while agitating the same, and after a period of several hours is removed, drained, and dried. The soaking may be repeated, if necessary, in order to deposit on the mass approximately 5% by weight of the zeolite. Then the impregnated mass, preferably after grinding, is placed in a disk mold and compressed under a pressure of about 10 tons per sq. in. to form a disk-shaped electrode. The electrode comprises about 1% platinum, about 5% of zeolite, and about 94% of carbon, weight basis. It is characterized by having a porosity of at least 15%, with pores of a substantially uniform diameter in the range of 0.5 to 50 microns.

The periodic table classifications as used herein are based on the arrangement distributed by E. H. Sargent & Co. and further identified by the legend, "Copyright 1962 Dyna-Slide Co."

It will be understood that the invention is capable of obvious variations without departing from its scope.

In the light of the foregoing description, the following is claimed:

1. In a fuel cell having a porous fuel electrode spaced from an oxygen electrode and an aqueous acidic electrolyte with which the electrodes make contact, and wherein a reformable fuel is employed which has at least one carbon-containing bond selected from carbon-to-carbon and carbon-to-hydrogen bonds, the improvement wherein said porous fuel electrode comprises 51 to 98% of an electron-conducting material, 0.01 to 25% of an electrochemical catalyst, and 0.1 to 20% of a crystalline aluminosilicate molecular sieve, weight basis, said catalyst being in particulate form and making contact with said electron-conducting material, said molecular sieve being made up of particles having a diameter ranging from below 1 micron up to 50 microns and being substantially in contact with said catalyst, said sieve having a silicon:aluminum ratio in the range of 3:1 to 90:1 by virtue of which it is stable against breakdown by acid attack during continuous contact with said acidic electrolyte and while electric current is flowing through the latter, said sieve being at least partially convertible to a stable acid form thereof during said contact, said sieve having pores to receive molecules of said reformable fuel and being active to catalyze bond-breaking reactions of said fuel to form electrochemically reactive products, said catalyst being active to catalyze the electrochemical conversion of at least one of said products to produce electrons, said electron-conducting material conducting said electrons to a draw-off terminal of said fuel cell, and said electrode comprising a shaped structure having a thickness of about 1/32 to about 1/4 inch and pores of a diameter in the range of 0.05 to 50 microns.

2. The fuel cell of claim 1 wherein the molecular sieve particles are distributed in and through the entire fuel electrode.

3. The fuel cell of claim 1 wherein the molecular sieve particles are concentrated on the outer surfaces of the fuel electrode.

4. The fuel cell of claim 1 wherein the molecular sieve particles are concentrated in one side portion of the fuel electrode.

5. The fuel cell of claim 1 wherein said electrochemical catalyst comprises an element of Group VIII of the Periodic Table.

6. The fuel cell of claim 5 wherein said electrochemical catalyst is platinum and said electron-conducting material is carbon.

7. The fuel cell of claim 1 in which said silicon:aluminum ratio is in the range of 3.3:1 to 20:1.

References Cited by the Examiner

UNITED STATES PATENTS

| | | | |
|---|---|---|---|
| 1,840,450 | 1/1932 | Jaeger et al. | 252—454 |
| 2,938,064 | 5/1960 | Kordesch | 136—122 |
| 2,971,904 | 2/1961 | Gladrow et al. | 252—454 |
| 3,040,115 | 6/1962 | Moos | 136—86 |
| 3,077,508 | 2/1963 | Oswin | 136—122 |
| 3,097,116 | 7/1963 | Moos | 136—86 |
| 3,097,974 | 7/1963 | McEvoy et al. | 136—120 |
| 3,117,034 | 1/1964 | Tirrell | 136—86 |
| 3,130,006 | 4/1964 | Rabo et al. | 252—454 |
| 3,130,007 | 4/1964 | Breck | 252—455 |
| 3,140,251 | 7/1964 | Plank | 252—455 |

JOHN H. MACK, *Primary Examiner.*